(12) United States Patent
Litvak et al.

(10) Patent No.: US 12,039,167 B2
(45) Date of Patent: Jul. 16, 2024

(54) METHOD AND SYSTEM FOR IMPROVING PERFORMANCE DURING DEDUPLICATION

(71) Applicant: Dell Products L.P., Round Rock, TX (US)

(72) Inventors: Michael Litvak, Shoham (IL); Vladimir Shveidel, Pardes-Hana (IL); Bar David, Rishon Lezion (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 17/511,107

(22) Filed: Oct. 26, 2021

(65) Prior Publication Data

US 2023/0130096 A1  Apr. 27, 2023

(51) Int. Cl.
  *G06F 3/06* (2006.01)
  *G06F 16/176* (2019.01)
  *G06F 16/18* (2019.01)

(52) U.S. Cl.
  CPC ............ *G06F 3/061* (2013.01); *G06F 3/0641* (2013.01); *G06F 3/0656* (2013.01); *G06F 3/0683* (2013.01); *G06F 16/1774* (2019.01); *G06F 16/1815* (2019.01)

(58) Field of Classification Search
  None
  See application file for complete search history.

(56) References Cited

U.S. PATENT DOCUMENTS 9,679,040 B1 * 6/2017 Davis ................... G06F 16/275
2016/0350358 A1 * 12/2016 Patel ................... G06F 16/1748

* cited by examiner

*Primary Examiner* — Michael Alsip
(74) *Attorney, Agent, or Firm* — Krishnendu Gupta; Deepika Bhayana; Derek Lam

(57) ABSTRACT

A method is used for improving performance in a storage system during deduplication. A processor receives a request to write data. A determination is made that the data can be deduplicated. A non-exclusive lock for a page in storage with a reference count of the data may be obtained, and an instruction to increment the reference count for the data may be stored in a metadata journal. The non-exclusive lock for the page may be released.

18 Claims, 10 Drawing Sheets

METHOD AND SYSTEM FOR IMPROVING PERFORMANCE DURING DEDUPLICATION

BACKGROUND

Technical Field

This application relates to improving performance during deduplication, particularly by allowing concurrent updates to reference counts for data.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

Data deduplication (also referred to simply as "deduplication") is a space-saving technology intended to eliminate redundant (duplicate) data (such as, files) on a data storage system. By saving only one instance of a file, disk space can be significantly reduced. For example, suppose a file of size 10 megabytes (MB) is stored in ten folders of each employee in an organization that has ten employees. As a result, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

SUMMARY OF THE INVENTION

One aspect of the current technique is a method for improving performance in a storage system during deduplication. A processor receives a request to write data. A determination is made that the data can be deduplicated. The method includes obtaining a non-exclusive lock for a page in storage with a reference count of the data, and storing, in a metadata journal, an instruction to increment the reference count for the data. The non-exclusive lock for the page is released.

Before releasing the non-exclusive lock for the page, a second request to write the data that can be deduplicated may be received, and a second instruction to increment the reference count for the data may be stored in the metadata journal. The increment to the reference count for the data may be persisted from the metadata journal. The method may determine whether a cache includes a copy of the page including the reference count. If so, a flag indicating the copy of the page in the cache is inconsistent with the page in storage may be set.

The method may include identifying an event that requires an accurate value for the reference count for the data, upon which the status of the flag indicating whether the copy of the page in the cache is inconsistent with the page in storage may be determined. If the pages are inconsistent, the page in storage is reloaded into the cache and the flag is reset.

Another aspect of the current technique is a system, with a processor, for improving performance in a storage system during deduplication. The processor is configured to receives a request to write data. The processor is also configured to determine that the data can be deduplicated. The processor is further configured to obtain a non-exclusive lock for a page in storage with a reference count of the data, and store, in a metadata journal, an instruction to increment the reference count for the data. The processor is configured to release the non-exclusive lock for the page. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
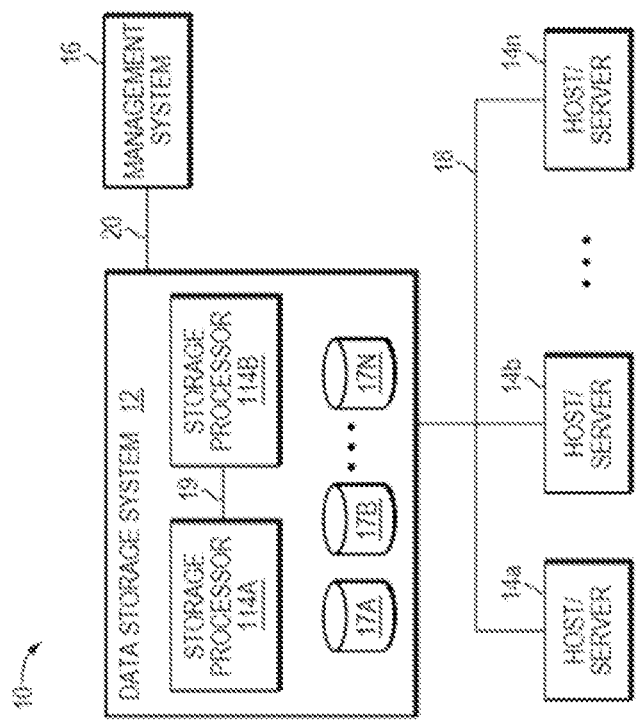
FIG. 1 depicts an example embodiment of a computer system 10 that may be used in connection with performing the techniques described herein.

Described below is a technique for improving performance in a storage system during deduplication, which technique may be used to provide, among other things, receiving, by a processor, a request to write data, determining that the data can be deduplicated, obtaining a non-exclusive lock for a page in storage with a reference count of the data, storing, in a metadata journal, an instruction to increment the reference count for the data, and releasing the non-exclusive lock for the page.

As previously explained, data duplication eliminates redundant data on data storage systems. When the data storage system determines that a write request involves duplicate data, instead of storing another copy of the data, a pointer to the existing data is set. Furthermore, the number of copies of the data is tracked via a reference count, such that each write request causes the reference count to be incremented.

In this manner, the reference count indicates whether the data storage system 12 is still storing that particular data. If the data storage system 12 receives instructions to delete data, if any of that data has been deduplicated, as the pointers are deleted, so is the reference count decremented. If the reference count become zero, then the original instance of the data is deleted and its storage space made it available for other purposes. Similarly, the storage space for the reference count is also reclaimed and repurposed. Thus, the reference count may be periodically checked as part of the data storage system's 12 background management processes.

In some situations, the data storage system 12 may receive multiple write requests for the same data in a short amount of time, and the reference count must be incremented to account for all the new instances of the data. Conventionally, each write request requires an exclusive lock on the page storing the reference count. As a result, subsequent write requests must remain queued until all previously arriving write requests have released their exclusive lock on the page. Furthermore, when the data storage system 12 include multiple nodes, the nodes must synchronize the write requests and exclusive locks among themselves. Under such techniques, entire pages of data are accessed to increment a reference count, and performance degrades due to the number of queued write requests and the need for synchronization among nodes.

In light of how the reference count is used, exclusive locks on the page storing the reference count can be forgone. Exclusive locks are often deployed to ensure that a value is reliable by preventing conflicting operations on the same data, but in the situations described above, the importance of the reference count lies in whether it is zero (0) or non-zero (0). In this context, the exact value need not be available at all times, especially since the write requests increase the reference count from one non-zero value to another. By using non-exclusive locks to a page, the latency for write requests may be diminished.

Instructions to increment a reference count can be stored in a journal, from which the updates can be persisted to the stored pages. In the meantime, any copies of the pages stored in the cache may remain unchanged. Consequently, the value of a persisted reference count may be inconsistent with the cache value, but this inconsistency will be immaterial in most use cases.

However, to ensure the accurate current value of the reference count is used when it is needed, when an instruction to increment a reference count is stored in the journal, the cache is checked for a copy of the page with the reference count. A flag for the cached page is set to indicate the inconsistency between its values and the persisted values. Any event that requires an exact current value for the reference count, such as a request to write to the page, will cause this flag to be checked and the page reloaded from storage into cache. Thus, the techniques described herein permit inconsistency between the cached value and the stored value in a manner that improves performance, without presenting inaccurate values when the exact value of the reference count is required.

In at least some implementations in accordance with the techniques as described herein, one or more of the following advantages can be provided: performance gains in input/output operations per second (IOPS).

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
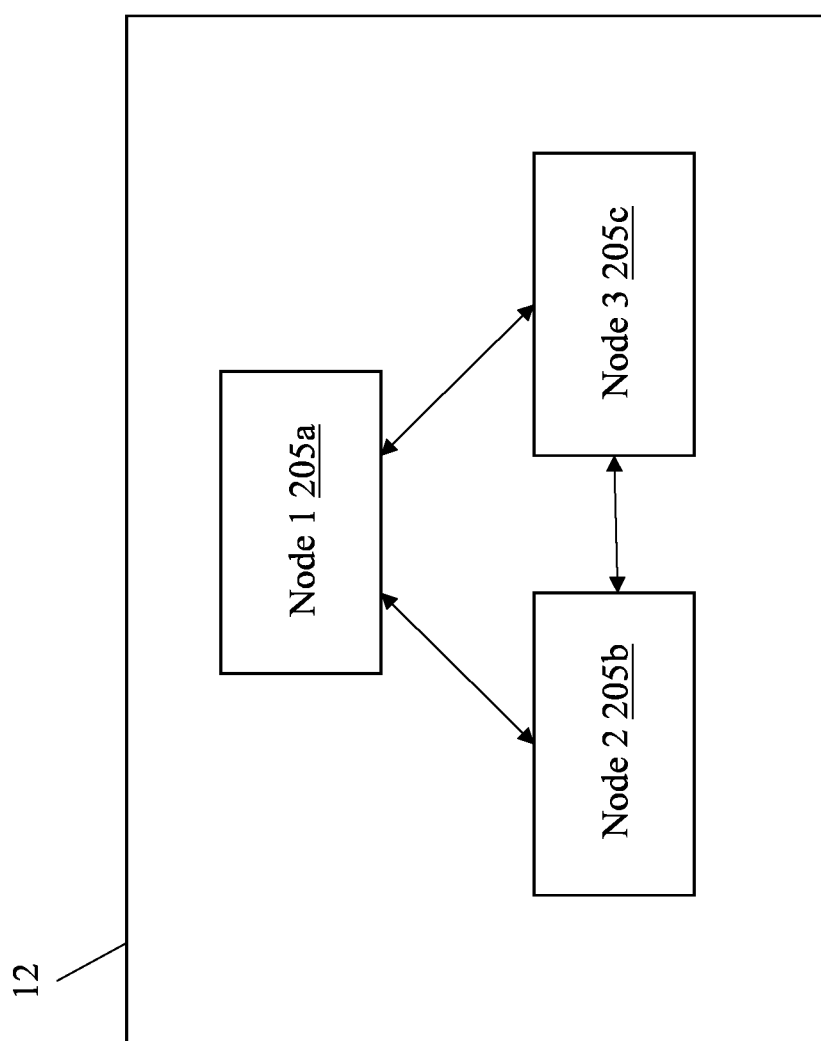
FIG. 2 is a block diagram depicting exemplary nodes among which the elements of the computer system of FIG. 1 may be distributed.

FIG. 2 is a block diagram depicting exemplary nodes 205a, 205b, 205c (individually and collectively, "205") among which the elements of the storage system 12 may be distributed. Although FIG. 2 depicts three nodes 205a, 205b, 205c, various embodiments of the invention may include any number of nodes. The nodes 205 may form a cluster. In some embodiments, the contents of one node 205a may be replicated to another node 205b. In further embodiments, each node 205 may receive I/O requests, and the nodes 205 communicate with one another to maintain consistency between the nodes 205.

Figure 3:
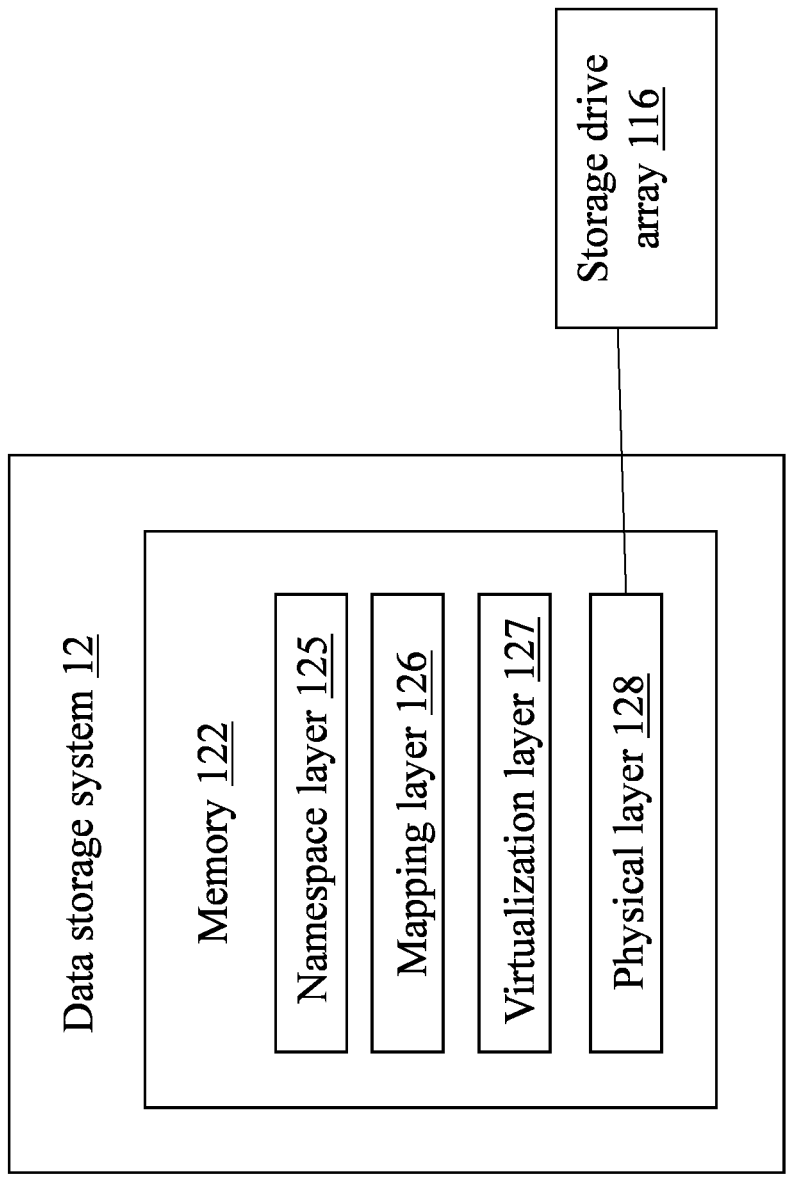
FIG. 3 depicts an exemplary embodiment of a data storage system used in the computer system of FIG. 1.

FIG. 3 depicts an exemplary embodiment of a data storage system 12 used in the computer system 10 of FIG. 1. In addition to the storage processors 114A, 114B and data storage devices 17a-17n depicted in FIG. 1, the data storage system 12 can include a memory 122. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 125, a mapping layer 126, a virtualization layer 127, a physical layer 128, and/or any other suitable software constructs.

The namespace layer 125 is a logical structure configured to organize storage objects such as VVOLs, LUNs, file systems, and/or any other suitable storage objects, accessible to the plurality of hosts 14a-14n. The namespace layer 125 can track logical addresses of storage objects, such as offsets into LUNs or file system addresses. For example, if a LUN made up of one or more extents were to have a maximum size of 10 gigabytes (Gb), then the namespace layer 125 may provide a 10 Gb logical address range to accommodate the LUN.

The mapping layer 126 is a logical structure configured to map the logical addresses of the storage objects in the namespace layer 125 to virtualization structures (also referred to herein as "virtual pointers") in the virtualization layer 127. To that end, the mapping layer 126 can include multiple pointer arrays (e.g., indirect pointer arrays) in a mapping hierarchy configured as a multi-level tree. For example, such a pointer array may include a pointer to a child pointer array, and may be pointed to by a pointer in a parent pointer array.

The virtualization layer 127 is a logical structure configured to provide block virtualization. For example, the virtualization layer 127 may have an aggregation of virtual layer blocks (VLBs), each of which may include a plurality of virtual pointers (e.g., 512 virtual pointers). Further, the lowest level of the multi-level tree in the mapping layer 126 may include an array of leaf pointers, each of which may point to one of the virtual pointers included in a respective VLB of the virtualization layer 127.

The physical layer 128 is configured to store an aggregation of physical layer blocks (PLBs). For example, such a PLB may include an aggregation of compressed data blocks, individually compressed data blocks, and/or uncompressed data blocks. Further, each virtual pointer included in a respective VLB of the virtualization layer 127 may point to a data block in a respective PLB of the physical layer 128. It is noted that, although the physical layer 128 is described herein using the term "physical", an underlying storage drive array 116 is typically responsible for the actual, physical storage of host data. The storage drive array 116 can include the storage devices 17a-17n depicted in FIG. 1. The storage drive array 116 may include magnetic disk drives, electronic flash drives, optical drives, and/or any other suitable physical drives. The storage drive array 116 can be attached to one or more I/O channels of the data storage system 12, while also being accessible over the network 18.

Figure 4:
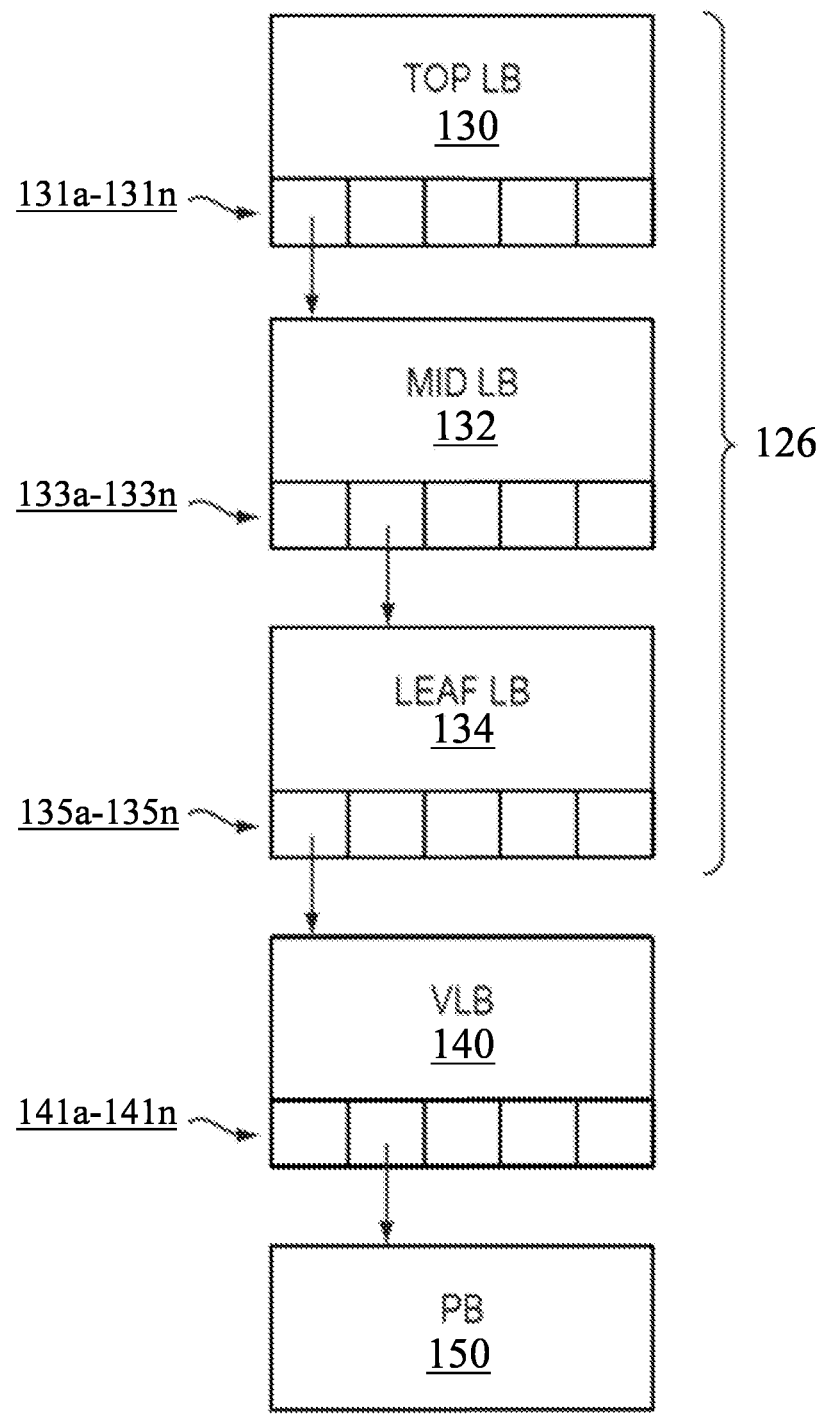
FIG. 4 is an exemplary block diagram depicting an example of the mapping layer, virtualization layer, and physical layer.

FIG. 4 is an exemplary block diagram depicting an example of the mapping layer 126, virtualization layer 127, and physical layer 128. In this embodiment, the mapping layer 126 includes a collection of logical blocks organized in a tree structure with three levels: the top-level logical blocks (top LBs) 130, the mid-level logical blocks (mid LBs) 132, and the leaf logical blocks (leaf LBs) 134. Various embodiments of the mapping layer 126 may include tree structures with other numbers of levels, such as a two-level tree, or a flat table that maps logical locations with physical locations.

In some embodiments, a top LB 130 has one or more pointers 131a-n associated with it. In some embodiments the one or more pointers 131a-n are located within the top LB 130 at indices, whereby each of the one or more pointers 131a-n is located at a different index within the top LB 130. In some embodiments, the one or more pointers 131a-n each point to a mid LB 132.

In some embodiments, each mid LB 132 has one or more pointers 133a-n associated with it. In some embodiments the one or more pointers 133a-n are located within each of the respective one or more mid LBs 132 at indices, whereby each of the one or more pointers 133a-n is located at a different index within each of the respective one or more mid LBs 132. In some embodiments, the one or more pointers 133a-n each point to a leaf LB 134.

In some embodiments, each leaf LB 134 has one or more pointers 135a-n associated with it. In some embodiments, the one or more pointers 135a-n are located within each of the respective one or more leaf LBs 134 at indices, whereby each of the one or more pointers 135a-n is located at a different index within each of the respective one or more leaf LBs 134. In some embodiments, the one or more pointers 135a-n each point to a virtual block (VLB) 140.

Although the embodiment in FIG. 4 depicts logical blocks organized in a three-level tree structure, in various embodiments, the tree structure may have other numbers of levels that are organized and described according to other schema. For example, a four-level tree may include super blocks, which point to top indirect blocks. Top indirect blocks may point to mid indirect blocks, and mid indirect blocks may point to leaf indirect blocks. Finally, the leaf indirect blocks may point to virtual blocks VLB 40.

In some embodiments, each VLB 140 has one or more pointers 141a-n associated with it. In some embodiments, the one or more pointers 141a-n are located within each of the respective one or more VLBs 140 at indices, whereby each of the one or more pointers 141a-n is located at a different index within each of the respective one or more VLBs 140. In some embodiments, the one or more pointers 141a-n each point to a block (PB) 150 in physical storage.

In the prior art, the pointers 131a-n, 133a-n, 135a-n, and 141a-n are a combination of an address of the block pointed to and an index within the pointed-to block. In some embodiments, the address of the block pointed to and the index within the pointed-to block are encoded into a single value. In some embodiments, the address of the block pointed-to and the index within the pointed-to block are stored as separate values and used together or combined when needed (e.g., when locating the actual contents at the specific location being referenced). In this way, the mapping layer 126, virtualization layer 127, and physical layer 128 can be traversed by following the pointers.

Figure 5:
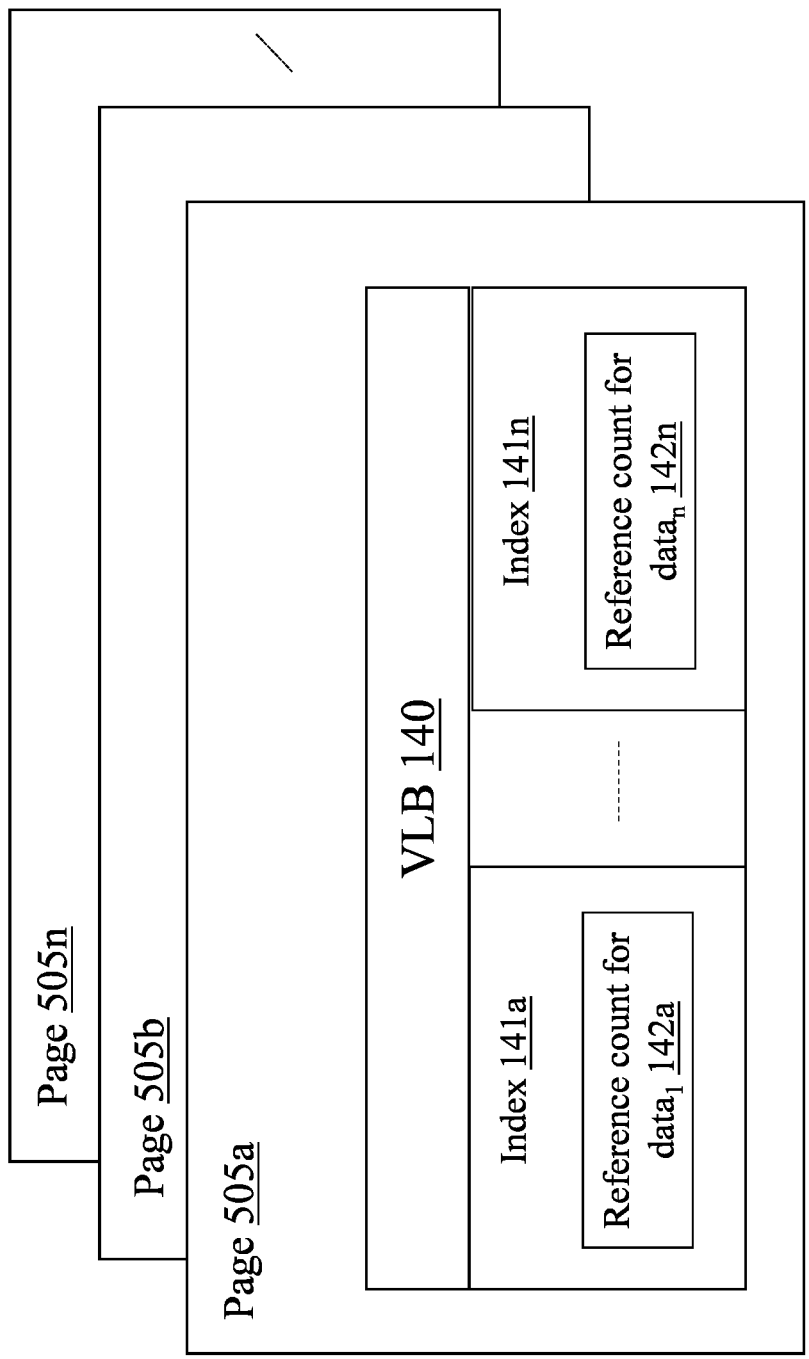
FIG. 5 depicts an exemplary VLB in the virtualization layer used in the data storage system of FIGS. 1-4.

FIG. 5 depicts an exemplary VLB 140 in the virtualization layer used in the data storage system of FIGS. 1-4. Pages 505a, 505b, . . . , 505n (individually and collectively, "505") can store VLBs 140. An exemplary VLB 140 has indices 141a-n ("141") corresponding to blocks of stored data. In this embodiment, an index 141a stores a reference count 142a indicating the number of instances of a particular set of data. The reference count 142a is created when the data becomes a candidate for deduplication. So long as the data storage system 12 includes at least one instance of the data, the reference count 142a will be non-zero. The reference count 142a becomes zero when all instances of the data, including deduplicated instances that point to the saved copy of the data, have been deleted. The storage space for the data and the reference count 142a will be reclaimed via garbage collection, and the storage will be reallocated for other purposes.

Figure 6:
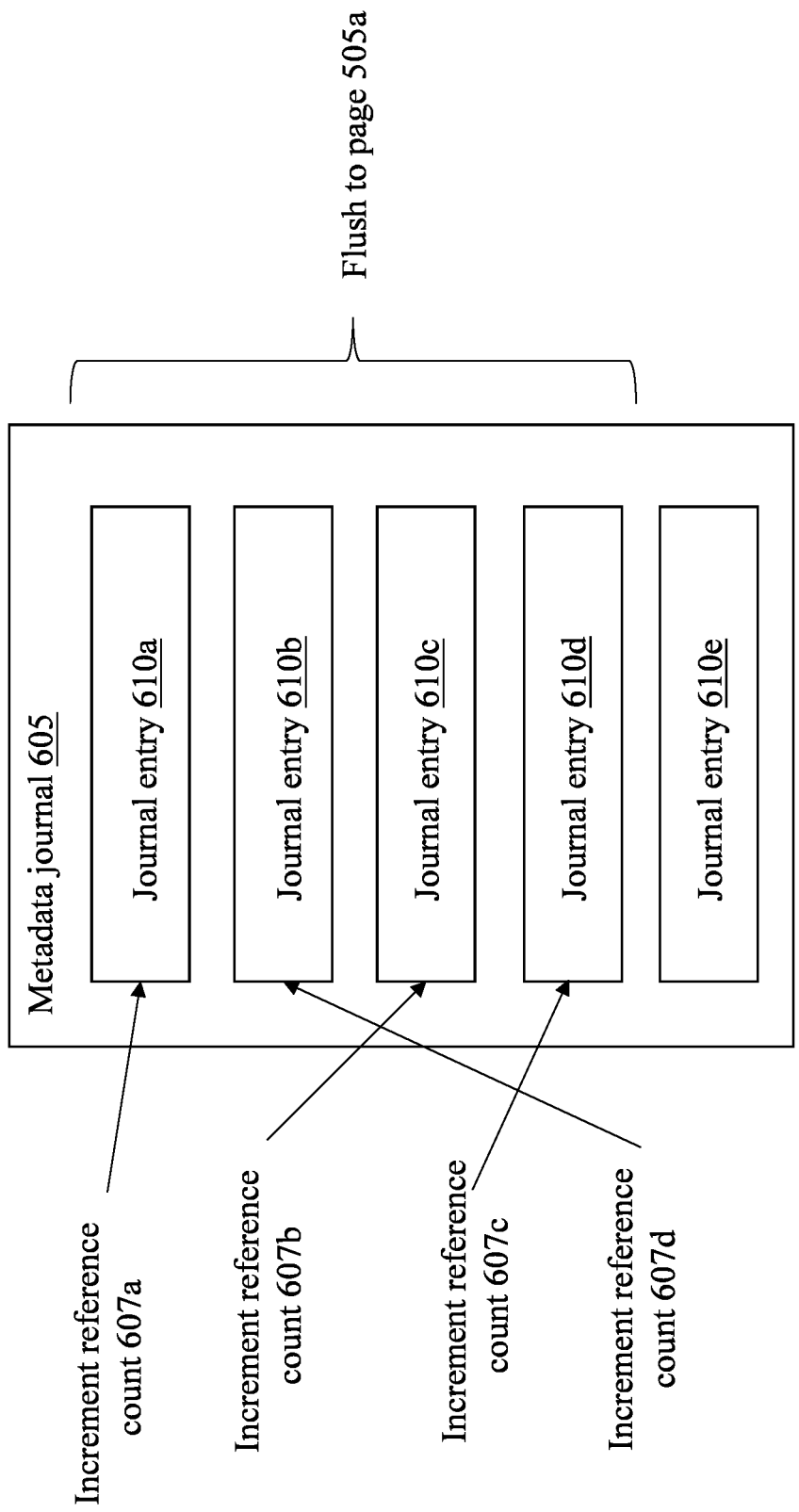
FIG. 6 is an exemplary metadata journal that stores instructions to increment the reference count for data.

FIG. 6 is an exemplary metadata journal 605 that stores instructions to increment the reference count for data. When the data storage system 12 receives several instructions to write the same data to storage, the system 12 determines that this data can be deduplicated. The determination generates several instructions, such as 607a, 607b, 607c, and 607d (collectively, "607"), to increment the reference count for the data, and these instructions 607 are entered into a journal 605 dedicated to changes in metadata. The metadata journal 605 includes multiple entries 610a . . . 610e, and the instructions 607 may be added to the entries 610 in the order in which they generated or in which they reach the metadata journal 605.

To log an instruction 607, the data storage system 12 identifies the page 505 with the reference count 142. The system 12 obtains a non-exclusive lock for page 505, and adds the instruction 607 to increment the reference count 142 to the metadata journal 605. Because the lock is non-exclusive, the data storage system 12 can add multiple instructions pertaining to the same page 505, and even the reference count 142 for the same data, to the metadata journal 605, without waiting for any locks to be released.

Figure 7:
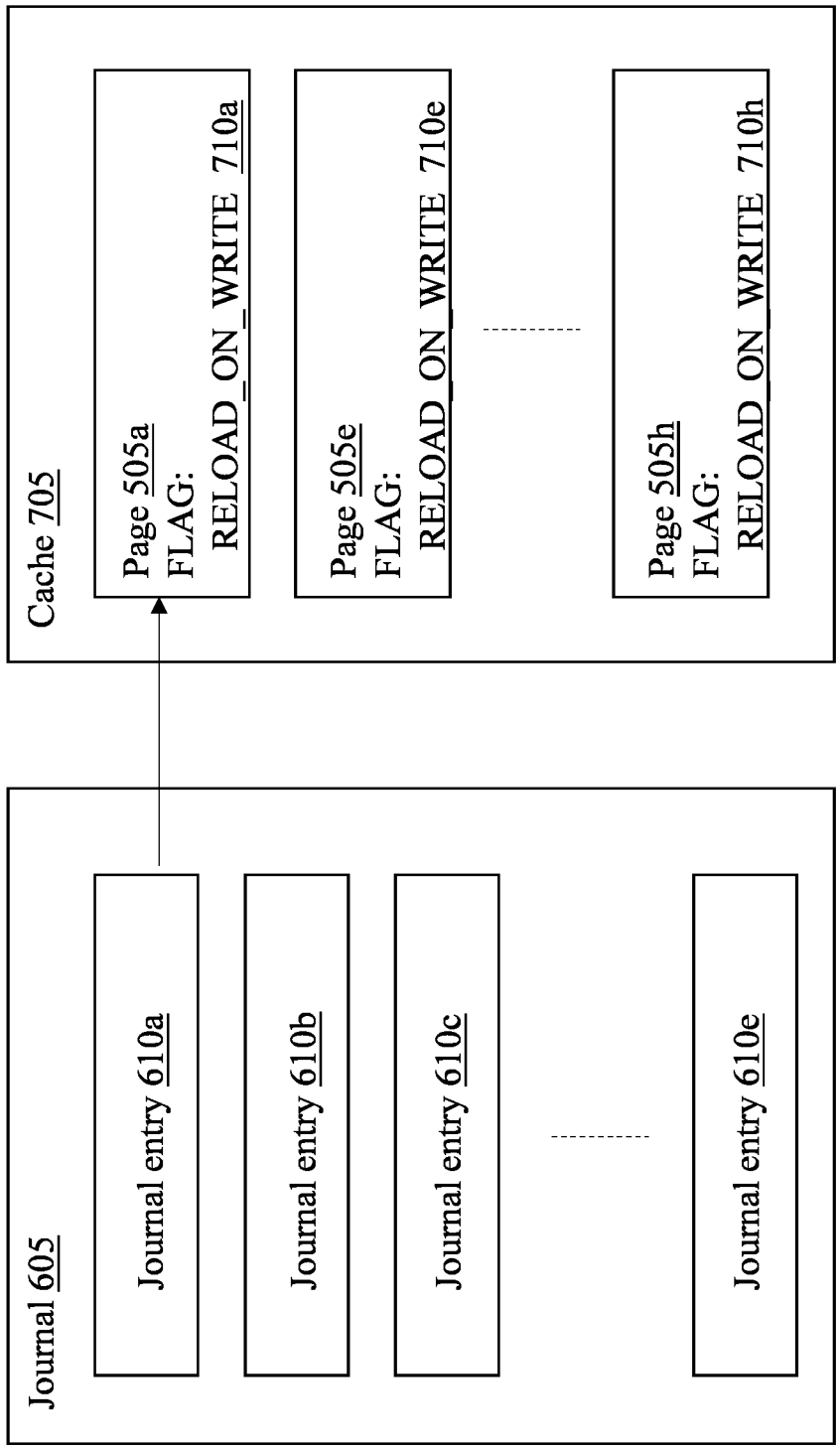
FIG. 7 shows the metadata journal of FIG. 6 and a cache that stores pages.

The data storage system 12 persists the instructions 607 stored in the entries 610 of the metadata journal 605, thereby incrementing the reference count 142 of deduplicated data. If the cache 705 (as shown in FIG. 7) includes a copy 505' of the page 505 with the reference count 142, any instruction to increment the reference count 142 will render data in the cached page 505' obsolete. As previously discussed, inconsistency between the cached page 505' and the stored page 505 will be immaterial in most use cases, as the instructions 607 are changing the reference count from one non-zero value to another. Furthermore, applying concurrent updates to the stored page 505 and the cached page 505' may be undesirable, due to the processing resources that would be incurred. Additionally, if the cache page buffer does not have write access to the cached page 505' or is otherwise operating upon other pages 505', such updates might be delayed.

Consequently, techniques described herein permit inconsistency between the cached page 505' and the stored page 505 until a need arises for the exact current value of the reference count. When the page 505 is under the non-exclusive lock and instructions 607 are being stored in the metadata journal 605, the cache 705 is checked to determine whether it includes a copy 505' of the stored page 505. If so, recognizing that data in the cached page 505' will become invalid due to the instructions 607, a flag 710 (e.g., RELOAD_ON_WRITE) is set to indicate that the cached page 505' is inconsistent with the stored page 505.

Any event that requires an exact current value for the reference count 142, such as a request to write to the page 505, will cause this flag 710 to be checked. If the flag 710 is set, then the page 505 is reloaded from storage into cache 705. As a result, the current value of the reference count 142, obtained from persisting the instructions 607 to increment to VLB 140 on the page 505, becomes available in the cache 705. Then, the flag 710 is cleared to indicate the cached page 505' is consistent with the stored page 505.

Figure 8:
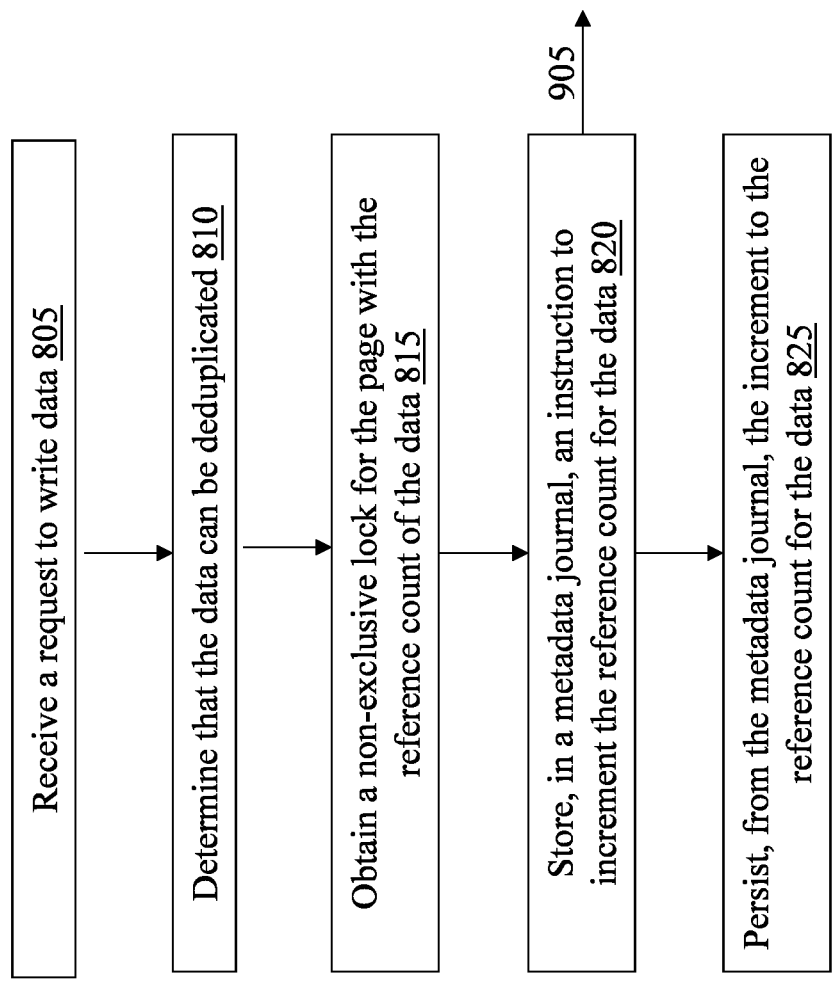
FIGS. 8-10 are exemplary flow diagrams of methods for improving performance during deduplication in a storage system, according to techniques described herein.

FIG. 8 is an exemplary flow diagram 800 of a method for improving performance during deduplication in a storage system. The storage system receives a request to write data (step 805) and determines that the data can be deduplicated (step 810). A non-exclusive lock for the page with the reference count of the data is obtained (step 815). An instruction to increment the reference count for the data is stored in a metadata journal (step 820). Because the lock for the page is non-exclusive, other requests to write the same data can be processed while the instruction to increment the reference count is being created and stored. In this manner, multiple instructions for incrementing can be added to the metadata journal, and moreover, the reference count can be incremented concurrently. Then, the increment to the reference count for the data is persisted from the metadata journal (step 825).

Figure 9:
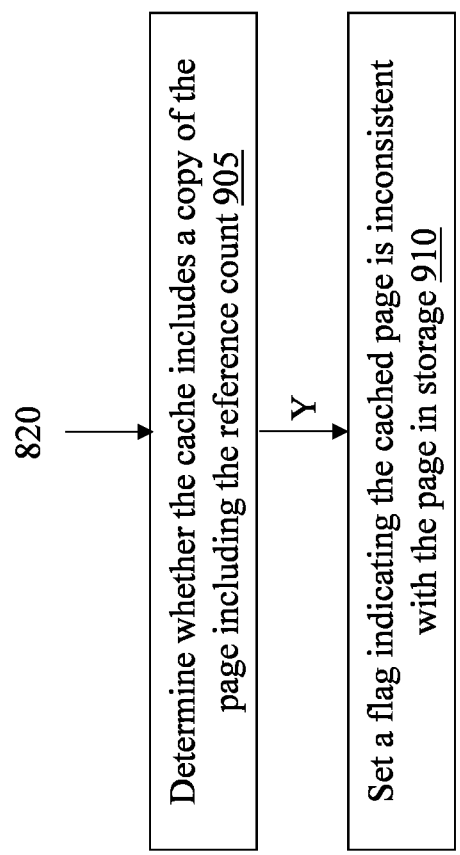

FIG. 9 is an exemplary flow diagram 900 for additional steps after storing, in the metadata journal, the instruction to increment the reference count for the data (step 820). The data storage system 12 determines whether the cache includes a copy of the page including the reference count (step 905). If so, the instruction to increment the reference count for the data renders the value in the cached page invalid. Thus, a flag is set that indicates the cached page is inconsistent with the page in storage (step 910).

Figure 10:
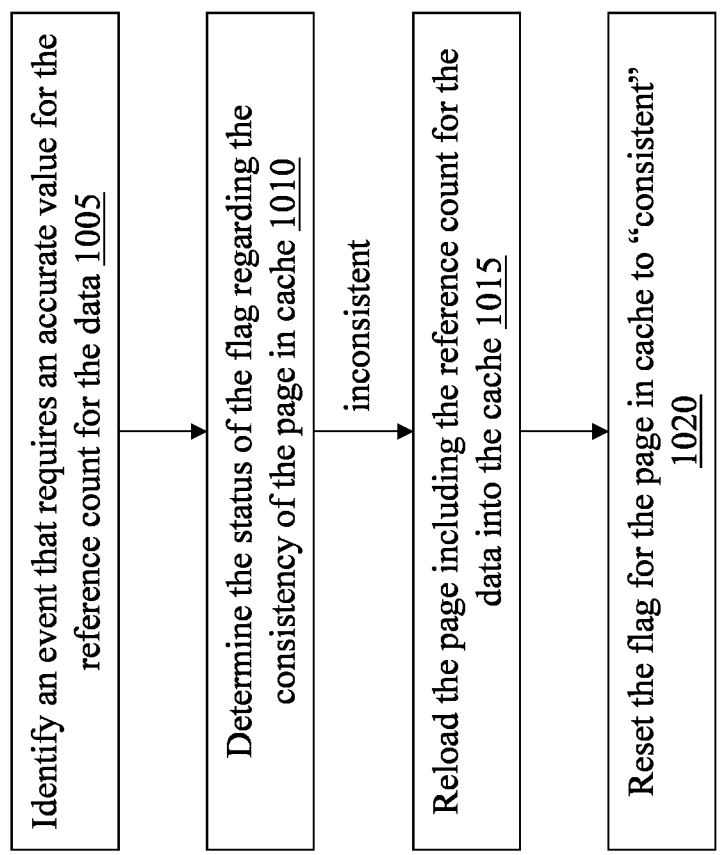

FIG. 10 is an exemplary flow diagram 1000 of a method for ensuring requested data is accurate, in the midst of improving performance during deduplication in a storage system. The data storage identifies an event that requires an accurate value for the reference count for the data (step 1005). While instructions to increment a reference count are persisted, the value stored in the cached page becomes invalid. Some use cases check the reference count for whether the value is zero or non-zero, in which case inaccuracy regarding the exact value does not lead to an erroneous operation. However, some events will require an accurate value. For these events, the status of the flag regarding the consistency of the page in cache with the persisted page is determined (step 1010). If the flag indicates the cached page is consistent, then the reference count in the cached page may be accessed and returned. However, if the flag indicates that the cached page is inconsistent, then the accurate value that has ultimately been persisted in storage must be obtained. The data storage system reloads the page including the reference count for the data into the cache (step 1015) and resets the flag for the page to indicate consistency (step 1020).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for improving performance in a storage system during deduplication, the method comprising:
   receiving, by a processor, a request to write data;
   determining that the data can be deduplicated;
   obtaining a non-exclusive lock for a page in storage with a reference count of the data, the non-exclusive lock allowing for concurrent processing of multiple write requests involving the same data by enabling storage of multiple instructions to increment the reference count for the data in a metadata journal without a need for exclusive locks on the page;
   storing, in the metadata journal, an instruction to increment the reference count for the data; and
   releasing the non-exclusive lock for the page.

2. The method of claim 1, further comprising:
   before releasing the non-exclusive lock for the page, receiving a second request to write the data that can be deduplicated and storing, in the metadata journal, a second instruction to increment the reference count for the data.

3. The method of claim 1, further comprising:
   persisting, from the metadata journal, the increment to the reference count for the data.

4. The method of claim 1, further comprising:
   determining whether a cache includes a copy of the page including the reference count.

5. The method of claim 4, further comprising:
   setting a flag indicating the copy of the page in the cache is inconsistent with the page in storage.

6. The method of claim 5, further comprising:
   identifying an event that requires an accurate value for the reference count for the data.

7. The method of claim 6, further comprising:
   determining the status of the flag indicating whether the copy of the page in the cache is inconsistent with the page in storage.

8. The method of claim 7, further comprising:
   upon determining that the pages are inconsistent, reloading the page in storage into the cache.

9. The method of claim 8, further comprising:
   resetting the flag.

10. A system for improving performance in a storage system during deduplication, the system including a processor configured to:
    receive a request to write data;
    determine that the data can be deduplicated;
    obtain a non-exclusive lock for a page in storage with a reference count of the data, the non-exclusive lock allowing for concurrent processing of multiple write requests involving the same data by enabling storage of multiple instructions to increment the reference count for the data in a metadata journal without a need for exclusive locks on the page;
    store, in the metadata journal, an instruction to increment the reference count for the data; and
    release the non-exclusive lock for the page.

11. The system of claim 10, wherein the processor is further configured to:
    before the non-exclusive lock for the page is released, receive a second request to write the data that can be deduplicated and store, in the metadata journal, a second instruction to increment the reference count for the data.

12. The system of claim 10, wherein the processor is further configured to:
    persist, from the metadata journal, the increment to the reference count for the data.

13. The system of claim 10, wherein the processor is further configured to:
    determine whether a cache includes a copy of the page including the reference count.

14. The system of claim 13, wherein the processor is further configured to:
    set a flag indicating the copy of the page in the cache is inconsistent with the page in storage.

15. The system of claim 14, wherein the processor is further configured to:
    identify an event that requires an accurate value for the reference count for the data.

16. The system of claim 15, wherein the processor is further configured to:
    determine the status of the flag indicating whether the copy of the page in the cache is inconsistent with the page in storage.

17. The system of claim 16, wherein the processor is further configured to:

upon determining that the pages are inconsistent, reload the page in storage into the cache.

18. The system of claim 17, wherein the processor is further configured to:
reset the flag.

* * * * *